United States Patent [19]
Weiss et al.

[11] Patent Number: 6,097,123
[45] Date of Patent: Aug. 1, 2000

[54] BRAKE AND STALL DETECTOR FOR A MOTORIZED ACTUATOR

[75] Inventors: Kevin A. Weiss, Gurnee, Ill.; Jeffery S. Flannery, Dousman; Dennis J. Ulicny, Waukesha, both of Wis.

[73] Assignee: Johnson Controls Technology Company, Plymouth, Mich.

[21] Appl. No.: 09/325,080

[22] Filed: Jun. 3, 1999

[51] Int. Cl.[7] .......................... H02K 49/02; H02K 49/00; H02K 7/10; F16K 31/02; F16K 31/44
[52] U.S. Cl. ............................. 310/105; 310/93; 310/95; 310/98; 310/99; 310/68 B; 310/77; 251/129.13; 251/69; 251/71
[58] Field of Search .................................. 310/92, 93, 94, 310/95, 96, 98, 99, 100, 105, 103, 104, 107, 68 B, 75 R, 76, 77; 251/129.01, 129.11, 129.13, 69, 71; 188/161

[56] References Cited

U.S. PATENT DOCUMENTS

| | | | |
|---|---|---|---|
| 4,584,511 | 4/1986 | Rudich, Jr. et al. | 318/600 |
| 4,595,081 | 6/1986 | Parsons | 185/40 R |
| 4,621,789 | 11/1986 | Fukamachi | 251/129.12 |
| 4,669,578 | 6/1987 | Fukamachi | 185/40 R |
| 4,741,508 | 5/1988 | Fukamachi | 251/71 |
| 4,831,314 | 5/1989 | Tanaka et al. | 318/484 |
| 5,050,711 | 9/1991 | Sawato | 188/164 |
| 5,226,454 | 7/1993 | Cabalfin | 137/870 |
| 5,295,562 | 3/1994 | Hajny et al. | 188/187 |
| 5,633,546 | 5/1997 | Horst | 310/68 B |
| 5,637,945 | 6/1997 | Yamamuro et al. | 310/268 |
| 5,821,658 | 10/1998 | Boggs, III | 310/105 |
| 5,909,072 | 6/1999 | Muller | 310/68 B |
| 5,915,668 | 6/1999 | Hodapp et al. | 251/129.13 |
| 5,986,369 | 11/1999 | Hantley et al. | 310/77 |

*Primary Examiner*—Nestor Ramirez
*Assistant Examiner*—Dang Dinh Le
*Attorney, Agent, or Firm*—Quarles & Brady LLP; George E. Haas

[57] ABSTRACT

An actuator for an HVAC system includes a motor coupled by an electrically operated clutch to a gear train which drives an output connector. A spring is connected to the transmission to drive the output connector to a normal position in the event of a power failure. A control apparatus is connected to the transmission and provides the combined functions of a magnetic eddy current brake and a motion sensor.

29 Claims, 3 Drawing Sheets

BRAKE AND STALL DETECTOR FOR A MOTORIZED ACTUATOR

BACKGROUND OF THE INVENTION

The present invention relates to motorized actuators, such as of a type used to operate valves and dampers in a heating, ventilation and air conditioning system; and more particularly to mechanisms for braking such actuators and for detecting when the actuator stalls.

Electrically powered actuators are commonly used to open and close valves and airflow dampers in heating, ventilation and air conditioning (HVAC) systems. These actuators usually include an electric motor which is connected by a gear train to the valve or damper. This allows a low torque motor to operate a relatively large load. The motor can be operated to place the valve or damper in a number of positions between the extreme open and closed limits.

It is important in some installations that the device operated by the actuator assume a fail-safe position in the event that electrical power is lost. For example, it often is desired that a damper in an HVAC duct close when electrical power is lost as may occur during a fire. This ensures that air is not being supplied through the damper to a fire and that smoke is not circulated to other parts of the building.

In order to provide such fail-safe operation, actuators incorporate a return spring which winds as the actuator moves the valve or damper into an open position. Thus in the open position energy to close the valve or damper is stored in the spring. The spring unwinds as the actuator closes the valve or damper. When the motor stops, its detent torque as amplified by the gear train prevents the actuator from moving, thus preventing the return spring energy from moving the actuator into the closed, or home, position. Sometimes after the motor stops, a small current, less than that required to turn the motor, still is applied to further impede the spring from moving the actuator load.

A clutch is provided in the gear train between the motor and the spring with the spring always being connected to the output of the actuator. The clutch is operated by a solenoid so as to be engaged whenever electricity is available for powering the actuator motor, whether or not electricity is actually being applied by a control circuit to the motor. In the event that power is lost to the actuator, the clutch disengages thereby decoupling the motor from the gear train. This isolates the motor detent torque from inhibiting operation of the spring and enables the spring force to move the actuator into the home position.

One of the drawbacks of this type of arrangement occurs upon a power failure when the spring is wound significantly, thus storing a relatively large amount of energy. When the clutch now disengages, a very large spring force is applied, resulting in the output being driven at an excessively fast speed. That action may damage the valve or damper being operated by the actuator.

Another problem occurs when the actuator reaches one of the extreme travel limits of the valve or damper. At that time the valve or damper prevents the actuator motor from turning even though electricity still is being applied. This is known as a stall condition of the motor and the motor can be damaged if electricity continues to be applied for too long a time while the motor is stalled. If a stall condition persists for an excessive period, the gear train and actuator load also can be damaged. As a consequence, sensors are often attached to the motor to detect the stall condition.

SUMMARY OF THE INVENTION

A general object of the present invention is to provide a compact mechanism which brakes a fail-safe return of an actuator due to force of a spring.

Another object is to provide the same mechanism with a detector for stall conditions.

A further object of the present invention is to provide a magnetic eddy current brake.

Yet another object is to employ the magnet of the brake with a Hall effect sensor for stall detection.

An actuator for an HVAC system includes a motor connected by an electrically operated clutch to a transmission which drives an output coupling of the actuator. A spring is connected to the transmission and becomes wound and unwound by movement of the transmission. In the event of a power failure, the clutch disengages the motor from the transmission and the energy stored in the spring moves the output coupling to a normal, or fail-safe, position.

The actuator is improved by incorporating an apparatus for controlling speed of the output coupling, thus preventing the spring from driving the output coupling too fast. That apparatus comprises a stationary ring of conductive material with a magnet located and movable within the stationary ring. The magnet moves due to a connection to the transmission. Movement of the magnet produces eddy currents in the stationary ring which impedes movement of the magnet and the transmission coupled thereto. The magnitude of the impedance is a direct function of the magnet's speed. Thus the faster the magnet moves the greater the resistance to that movement.

In the preferred embodiment of the apparatus, the stationary ring has a gap within which a Hall effect sensor is located. The Hall effect sensor produces an electrical signal in response to movement of the magnet, thus providing an indication of whether the output coupling is moving and how fast. By properly locating a pair of Hall effect sensors around the ring, the respective signals can be used to determine the direction of the output coupling movement.

DETAILED DESCRIPTION OF THE INVENTION

Figure 1:
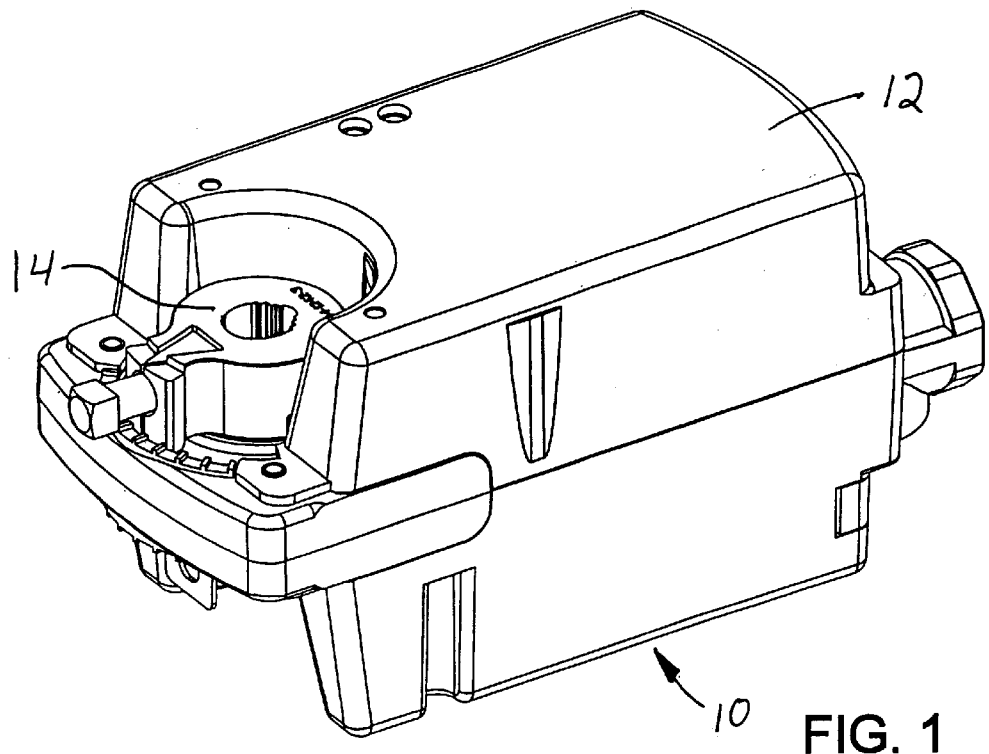
FIG. 1 is an isometric view of an actuator according to the present invention.

With initial reference to FIG. 1, actuator 10 comprises a housing 12 with an output coupling 14 through which a shaft of a device, such as a damper or a valve, can be inserted for operation by the actuator. The output coupling 14 turns through approximately 90° to operate the device, although other angles of rotation can be provided.

Figure 2:
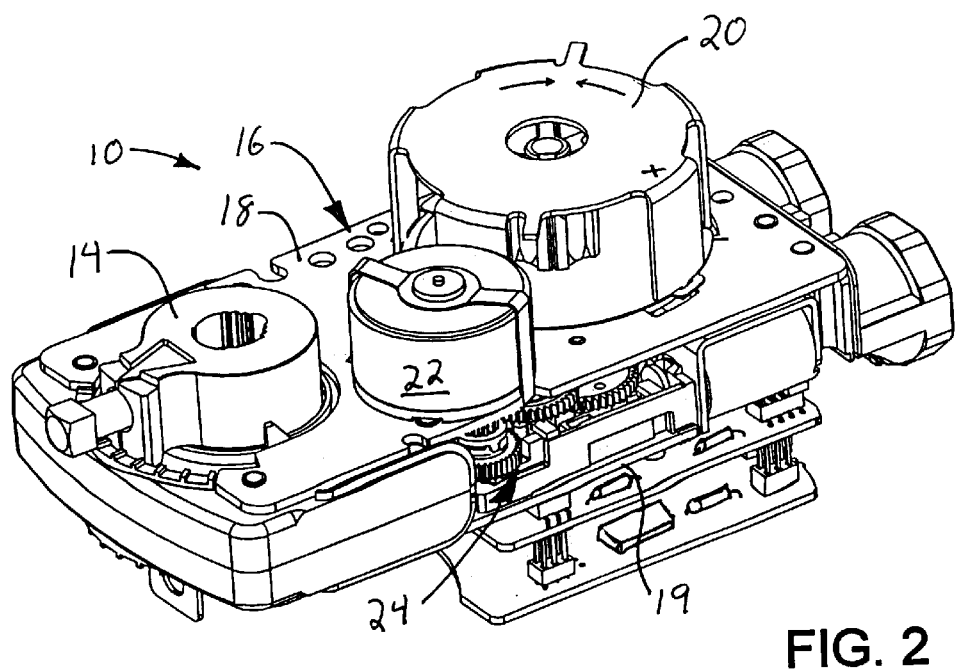
FIG. 2 is an isometric view of the actuator with the outer covers removed.

As shown in FIG. 2, within the housing 12 is a drive assembly 16 comprising a coiled spring 20 and an electric motor 22 mounted on a plate 18. The spring 20 and motor 22 are connected to the output coupling 14 by a gear train 24 located between plate 18 and a support plate 19. The gear train serves as a transmission which transfers force from the spring 20 and the motor 22 to the output coupling 14.

Figure 3:
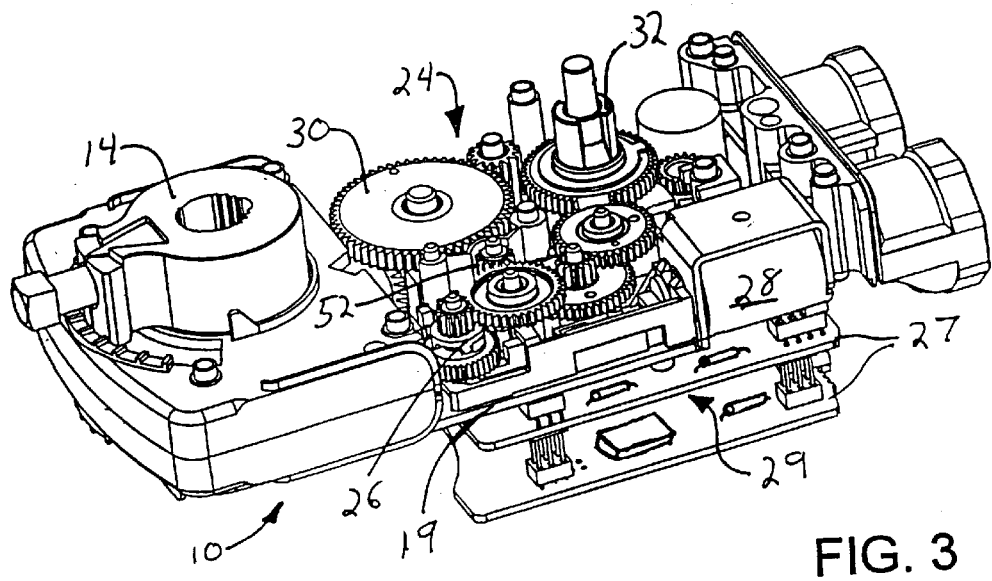
FIG. 3 is an isometric view of the actuator with the motor and spring assembly removed.

The gear train 24 is shown in detail in FIG. 3. A clutch 26 at one end of the gear train has a gear which engages an output gear on the shaft of motor 22. The clutch 26 is operated by a solenoid 28 which when electrically powered causes the clutch to engage and mechanically couple the motor to the remaining stages of the gear train 24. A spring in the solenoid 28 disengages the clutch 26 when the solenoid is de-energized. The gear train has approximately eight stages between the motor 22 and the output coupling 14, for example, with the gears for each stage mounted on pins extending from the support plate 19. A gear hub 32 at stage five of the gear train is provided to couple to the spring 20 in FIG. 2. The opposite end of the gear train from the clutch 26 has an output gear 30 which engages a gear attached to the output coupling 14.

Application of electricity to the solenoid 28 and the motor 22 is governed by a conventional control circuit 29 on printed circuit boards 27 attached beneath the support plate 19 in the orientation of the actuator in the drawings. As long as electricity is available to the actuator 10 the control circuit 29 applies electricity to keep the solenoid 28 energized and the clutch 26 engaged, thereby connecting the motor 22 through the gear train 24 to the output coupling 14. The gear ratio of the gear train 24 magnifies the detent torque of the motor 22 which provides resistance that prevents normal load force and the force from spring 20 from moving the output coupling 14 when the motor is de-energized.

Figure 4:
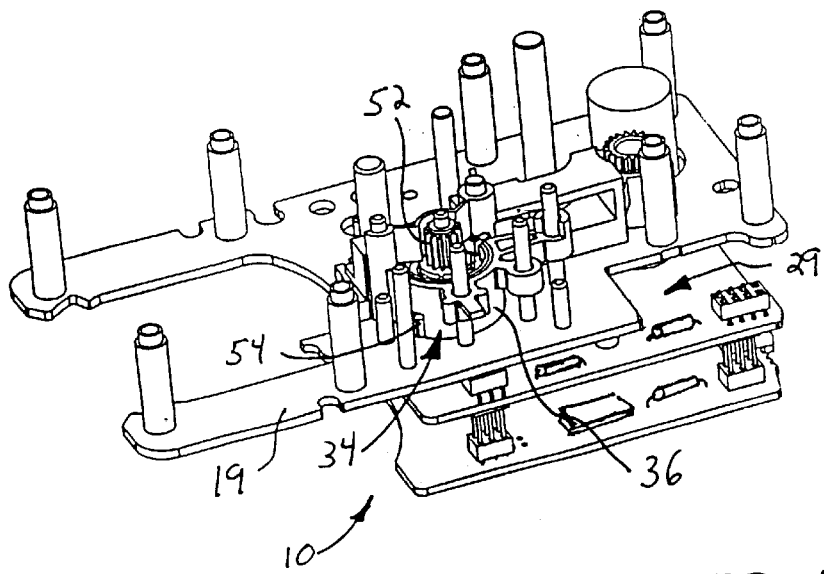
FIG. 4 is an isometric view showing the mounting of the brake and stall detector components of the actuator.
Figure 5:
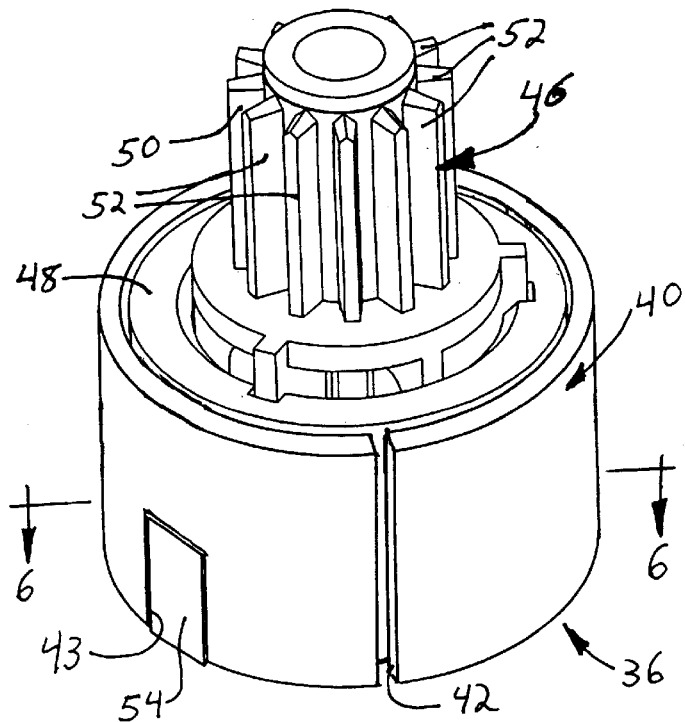
FIG. 5 is an isometric view of the brake and stall detector components.
Figure 6:
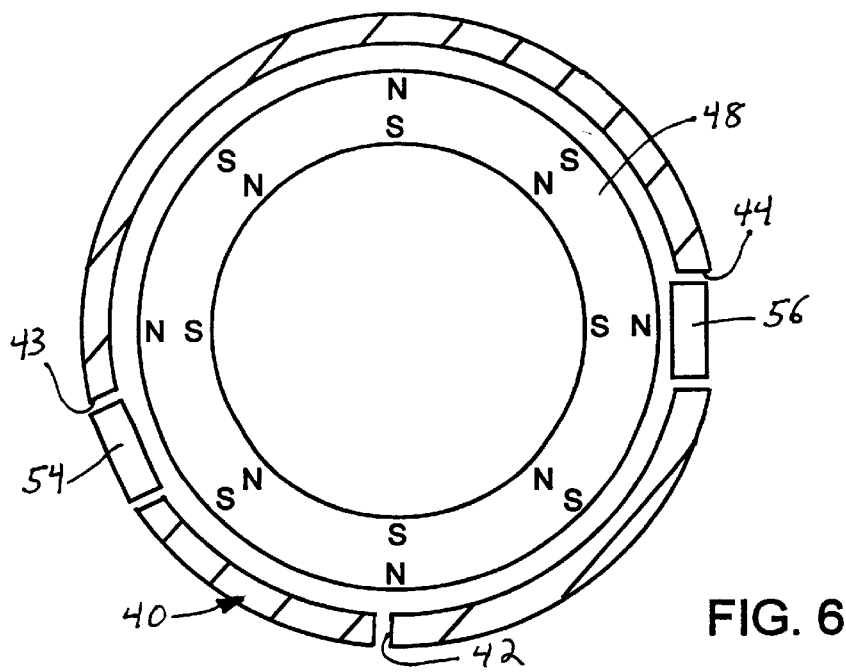
FIG. 6 is a conceptual representation of the mechanism for braking the actuator movement and detecting motor stall.

With reference to FIG. 4, a control apparatus 34 is connected to the third stage of the gear train 24 to provide braking and position sensing. The control apparatus 34 has a plastic housing 36 mounted on the gear train support plate 19 to hold a stator and rotor of a magnetic brake. With reference to FIGS. 5 and 6, the control apparatus 34 comprises a brake stator 40 in the form of an annular electrically conductive member with a gap 42, although the electrically conductive member could be a continuous ring. The brake stator 40 is formed of an electrically conductive material, such as copper or aluminum. For the purposes of this disclosure, the term "magnetic" means a member or material which has a sufficient magnetic susceptibility so as to be capable of being repelled or attracted by a magnetic field. In contrast, the term "magnet" means a member or material which already has been magnetized so as to produced a magnetic field or which produces a magnetic field upon application of electricity.

A brake rotor 46 is located within the central opening of the brake stator 40 and comprises an annular magnet 48 mounted on a hub 50. The hub 50 has integral gear teeth 52 that mesh with a stage of the gear train 24 which is between the clutch 26 and the output coupling 14. Thus the brake rotor 46 will rotate with any movement of the output coupling 14 regardless of the state of the clutch 26.

The annular magnet 48 extends around an end section of the hub and is fabricated of a neodymium ferrite boron composition. The magnet 48 has a cylindrical shape with eight radial poles spaced equal distances around its outer circumferential surface as shown in FIG. 6. The directions of the poles alternate as indicated by the designations N and S for the north and south poles. It also is apparent from FIG. 6 that notches 43 and 44 of the brake stator 40 are not diametrically opposed, but are offset one-half the distance between two adjacent poles from diametric opposition, or 157.5 degrees from one another in one direction around the annular brake stator. The two notches 43 and 44 are spaced $180°-kX°$ around the annular body 40 from each other, where k is a positive integer and $X°$ is equal to one-half an angular spacing between adjacent poles of the magnet 48.

The eight poles of the annular magnet 48 induce eddy currents within the metal brake stator 40 as the brake rotor 46 turns, thereby providing a load which retards rotation of the brake rotor. The magnitude of the retardation is a direct function of the speed of rotation, i.e., the faster the speed, the greater the resistance to motion. As a result of that relationship, the control apparatus 34 does not significantly impede the relatively slow motion produced by the motor 22 driving the output coupling 14. However, when the clutch 26 is disengaged, the control apparatus 34 acts as a brake to the force of spring 20 driving the gear train. If the spring is wound significantly, as occurs when the output coupling 14 is at the extreme position opposite to the normal position, the spring force tends to operate the gear train at a relatively high speed. However, as the speed of the gear train 24 increases, so too does the speed of the brake rotor 46. The control apparatus 34 reacts as a brake by providing significant resistance to that fast rotation, thereby limiting the rotational speed to an acceptable level. As the spring 20 unwinds exerting less force on the gear train 24, the movement slows and the resistance provided by the control apparatus 34 correspondingly decreases. Thus at slower speeds the control apparatus does not inhibit the spring 20 from moving the output coupling 14 fully into the normal or fail-safe position. In addition, the control apparatus 34 does not significantly inhibit the slow movement of the gear train produced by the motor 22.

Referring again to FIG. 6, a pair of Hall effect sensor 54 and 56 is located in separate notches 43 and 44, respectively, in the brake stator 40. As the annular magnet 48 rotates within the brake stator 40, the poles of the rotor pass the two Hall effect sensors 54 and 56 causing the sensors to produce an alternating sinusoidal electrical signal. The amplitude of each signal rises and falls as the north and south poles of the magnet 48 pass the Hall effect sensors. Thus, four positive peaks occur in the sensor signals during each rotation of the brake rotor 46.

Hall effect sensor signals are applied to the control circuit 29 which derives the operating state of the actuator from those signals. If proper variation of the Hall effect sensor signals is not detected after the motor 22 is energized, the control circuit 29 concludes that the clutch 26 has failed to engage. However, during normal operation the sensor signal should be a square wave with transitions occurring as the poles of the annular magnet 48 pass the Hall effect sensors 54 and 56. Thereafter, if the sensor signal amplitude ceases to change probably while the control circuit 29 still is applying electricity to the motor 22, a conclusion is drawn that motor 22 has stalled. Conversely, if the motor 22 is not being energized and the sensor signal amplitude significantly changes, the control circuit 29 concludes that the spring 20 or some other force is producing rotation of the actuator 10. The control circuit responds to this condition by not activating the solenoid 28 so that the clutch 26 does not become engaged until the return spring 20 no longer is rotating the gear train 24. Thus the signals from the Hall effect sensors are utilized to provide an indication of the operation of the actuator 10.

As noted previously, the two Hall effect sensors 54 and 56 are not located diametrically opposite one another, but are offset one-half the spacing between the poles of the annular magnet 48 from that diametric position. Therefore, as the magnet 48 rotates past the Hall effect sensors, the signal from one sensor will lead the signal from the other sensor, e.g., a positive peak occurs in one sensor signal slightly before a positive peak occurs in the other signal. Whether the signal from sensor 54 or 56 is leading provides an indication of the direction of rotation of the magnet 48 and thus the direction of actuator output coupling 14.

Figure 7:
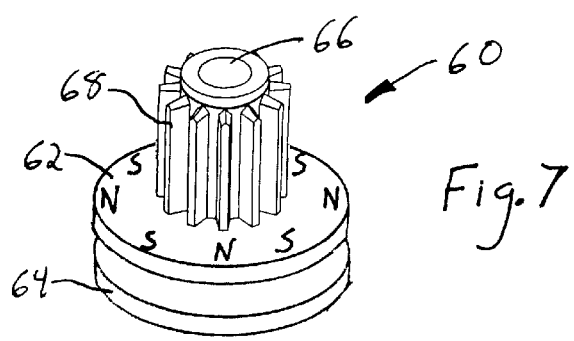
FIG. 7 depicts an alternative embodiment of the braking mechanism which employs a pair of disks.

With reference to FIG. 7, an alternative braking mechanism 60 comprises a pair of disks 62 and 64 which are spaced apart along a common axis. The first disk 62 is rotationally mounted on a pin 66 that extends from the support plate 19. The first disk 62 has an integral gear 68 that meshes with a stage of the gear train 24 which is between the clutch 26 and the output coupling 14. The second disk 64 is held stationary.

In the illustrated embodiment of disk braking mechanism 60, the first disk 62 forms a magnet 48 that has eight poles spaced equal distances radially around its circumference. As the first disk rotates being driven by the gear train 24, eddy currents are induced in the electrically conductive second disk 64 which impedes movement of the first disk and the gear train coupled thereto. Hall effect sensors can be placed adjacent to the first disk 62 in a manner similar to the sensors 54 and 56 in FIG. 6 to sense movement of the actuator. If motion sensing is not required, the stationary second disk 64 can be magnetized with multiple poles and the rotating first disk 62 can merely be formed of electrically conductive material.

What is claimed is:

1. An HVAC system actuator comprising:
   a motor;
   an output coupling to connect a load to the actuator;
   a transmission connecting the motor to the output coupling;
   an energy storage device for moving the output coupling to a given position upon loss of power to the motor; and
   an apparatus for limiting speed of the output coupling upon loss of power to motor, and including a magnet and an electrically conductive member spaced from the magnet, wherein one of the magnet and the electrically conductive member is connected to the transmission to produce movement which induces eddy currents in the electrically conductive member.

2. The HVAC system actuator as recited in claim 1 wherein the electrically conductive member is stationary in the actuator and the magnet has a member connected to the transmission wherein movement of the transmission causes the magnet to move with respect to the electrically conductive member.

3. The HVAC system actuator as recited in claim 2 wherein the member comprises a gear which meshes with the transmission.

4. The HVAC system actuator as recited in claim 1 wherein the energy storage device comprises a spring connected to the transmission.

5. The HVAC system actuator recited in claim 1 further comprising a Hall effect sensor located adjacent to the magnet and producing an electrical signal in response to movement of the magnet.

6. The HVAC system actuator as recited in claim 1 wherein one of the magnet and the electrically conductive member has an annular body and the other of the magnet and the electrically conductive member is received within the annular body.

7. The HVAC system actuator as recited in claim 1 wherein the electrically conductive member has an annular body; and the magnet is received within the annular body.

8. The HVAC system actuator recited in claim 7 wherein the annular body has a first notch and a second notch therein, wherein the first notch is not diametrically opposed to the second notch.

9. The HVAC system actuator recited in claim 8 further comprising a first Hall effect sensor within the first notch and a second Hall effect sensor within the second notch, wherein each of the first and second Hall effect sensors produces an electrical signal in response to movement of the magnet.

10. The HVAC system actuator as recited in claim 1 wherein the magnet is a permanent magnet.

11. The HVAC system actuator as recited in claim 1 wherein the magnet has a plurality of poles spaced in a radial pattern.

12. The HVAC system actuator as recited in claim 11 wherein the plurality of poles alternate in polarity going around the radial pattern.

13. The HVAC system actuator as recited in claim 11 wherein the magnet is cylindrical with an outer circumferential surface and has a plurality of poles spaced radially around the circumferential surface.

14. The HVAC system actuator as recited in claim 1 wherein:
   the magnet is cylindrical with an outer circumferential surface and has a plurality of poles spaced radially around the circumferential surface; and
   the electrically conductive member has an annular body extending around the magnet, and the annular body has a first notch and a second notch, wherein the second notch is spaced $180°-kX°$ around the annular body from the first notch, where k is a positive integer and $X°$ is equal to one-half an angular spacing between adjacent poles of the magnet.

15. The HVAC system actuator as recited in claim 14 further comprising a first Hall effect sensor within the first notch and a second Hall effect sensor within the second notch, wherein each of the first and second Hall effect sensors produces an electrical signal in response to movement of the magnet.

16. The HVAC system actuator as recited in claim 1 wherein the one of the magnet and the electrically conductive member is disk shaped.

17. The HVAC system actuator as recited in claim 1 wherein the magnet has a disk shape and is connected to the transmission.

18. The HVAC system actuator recited in claim 1 further comprising an electrically operated clutch connecting the motor to the transmission.

19. An actuator for operating a device of a heating, ventilation and air conditioning system, said actuator comprising:
   a motor;
   an output coupling adapted to be connected to the device;
   a transmission connecting the motor to the output coupling;
   a spring connected to the transmission and being wound and unwound by movement of the transmission;
   a stator of magnetic material;
   a magnet located and movable within the stator, wherein movement of the magnet produces eddy currents in the stator; and
   a member connecting the magnet to the transmission wherein movement of the transmission causes the magnet to move within the stator which induces eddy currents in the stator thereby increasing a load on the transmission and limiting speed of the output coupling.

20. The actuator recited in claim 19 further comprising an electrically operated clutch connecting the motor to the transmission.

21. The actuator as recited in claim 19 wherein the stator is annular with a gap.

22. The actuator as recited in claim 19 further comprising a Hall effect sensor within a notch in the stator and producing an electrical signal in response to movement of the magnet.

23. The actuator as recited in claim 19 wherein the stator has a first notch and a second notch, wherein the first notch is not diametrically opposed to the second notch.

24. The actuator recited in claim 23 further comprising a first Hall effect sensor within the first notch and a second Hall effect sensor within the second notch, wherein each of the first and second Hall effect sensors produces an electrical signal in response to movement of the magnet.

25. The actuator as recited in claim 19 wherein the magnet is a permanent magnet.

26. The actuator as recited in claim 19 wherein the magnet is cylindrical having an outer circumferential surface with a plurality of poles of alternating polarity spaced radially around the outer circumferential surface.

27. The actuator as recited in claim 19 wherein the transmission comprises a plurality of gears; and the member comprises a gear which meshes with one of the plurality of gears.

28. The actuator as recited in claim 19 wherein the magnet is a disk connected to the transmission.

29. The actuator as recited in claim 28 wherein the magnet has a plurality of poles of alternating polarity spaced radially around the disk.

* * * * *